United States Patent [19]

Casse et al.

[11] Patent Number: 4,987,981
[45] Date of Patent: Jan. 29, 1991

[54] TORQUE TRANSMISSION WITH A HYDRAULIC COUPLING UNIT AND LOCKING CLUTCH

[75] Inventors: Pierre Casse, Ermont; Jean-Claude Bochot, Claye Souilly, both of France

[73] Assignee: Valeo, Paris, France

[21] Appl. No.: 391,964

[22] Filed: Aug. 10, 1989

[30] Foreign Application Priority Data

Aug. 30, 1988 [FR] France .................. 88 11367

[51] Int. Cl.⁵ .............................. F16H 45/02
[52] U.S. Cl. ...................... 192/3.29; 192/109 R
[58] Field of Search ............ 192/3.28, 3.29, 3.3, 192/109 R

[56] References Cited

U.S. PATENT DOCUMENTS

| | | | |
|---|---|---|---|
| 4,199,047 | 4/1980 | Ling | 192/3.3 |
| 4,274,519 | 6/1981 | Moroto et al. | 192/3.28 |
| 4,353,444 | 10/1982 | Bionaz | 192/3.29 |
| 4,427,098 | 1/1984 | Kubo et al. | 192/3.28 |
| 4,437,551 | 3/1984 | Gimmler et al. | 192/3.28 |
| 4,735,297 | 4/1988 | Koshimo | 192/3.29 |
| 4,785,923 | 11/1988 | Ushijima | 192/3.3 |
| 4,809,830 | 3/1989 | Schierling et al. | 192/3.29 |

FOREIGN PATENT DOCUMENTS

| | | | |
|---|---|---|---|
| 867268 | 10/1941 | France | 192/109 R |
| 2045367 | 10/1980 | United Kingdom . | |
| 2069632 | 8/1981 | United Kingdom | 192/3.29 |

Primary Examiner—Rodney H. Bonck
Attorney, Agent, or Firm—Charles E. Brown; Charles A. Brown

[57] ABSTRACT

In a torque transmission, particularly for an automotive vehicle, of the kind including a hydraulic coupling unit and a locking clutch, the latter comprises essentially a piston and a clutch plate, the piston being mounted slidably on a hub to enable the friction pad to be gripped. The piston is coupled with the clutch plate through profiled coupling.

6 Claims, 1 Drawing Sheet

TORQUE TRANSMISSION WITH A HYDRAULIC COUPLING UNIT AND LOCKING CLUTCH

FIELD OF THE INVENTION

This invention relates to a torque transmission of the kind having a hydraulic coupling unit, for example a transmission designed for an automotive vehicle and also including a locking clutch. The invention is more particularly directed to the structure of such a locking clutch.

BACKGROUND OF THE INVENTION

One transmission of the kind defined above is for example described in U.S. Pat. specification No. 4 353 444 and the corresponding French published Patent Application No. FR 2 453 335 A. It includes a hydrodynamic torque convertor, with a locking clutch enclosed within its own rotatable casing. In a modification, the clutch includes a piston which is mounted for axial sliding movement on a hub, together with a clutch plate which is fixed to the hub. Tongues or labelled are formed in the said clutch plate for coupling the piston with the hub for simultaneous rotation. The response of such a system to variations in pressure is better than that of a system using simple splined mounting. In addition, it has no torsion damper, by contrast with the arrangement described in U.S. Pat. specification No. 4 274 519. For this reason, it is possible to envisage that the sliding action of the clutch piston might be controlled in order to improve the damping of vibrations, by causing the pressure to vary within the chambers defined on either side of the piston, this variation being achieved for example by inversion of the pressures.

Nevertheless, there remains a problem when the clutch plate is integral with the above mentioned tongues. The force exerted by the tongues on the piston cannot be as regular as might be desired. In addition, there is a high risk of defects occurring in the flatness of the clutch plate. In order to try and ensure a regular force distribution, it is possible to attache the tongues individually to the clutch plate, but this results in an undesirable increase in the number of separate components.

SUMMARY OF THE INVENTION

The present invention proposes a novel type of locking clutch, which is structurally simplified and which is designed so as to provide a smoother displacement movement and a faster response time, while avoiding any transient engagement between components.

Accordingly, the invention provides a torque transmission having a hydraulic coupling unit arranged between an input element and an output element, the transmission being of the kind which includes a locking clutch adapted to effect direct mechanical coupling between the said input element and the said output element, and in which the said clutch includes a piston having a cylindrical surface whereby it is mounted on a hub, together with a clutch plate fixed to the hub for sliding movement on the latter, the said piston being arranged to engage against one part of the aid transmission (i.e. corresponding to the output element or the input element) through at least on friction pad means, the torque transmission being characterized in that profiled coupling means are formed between the said piston and the said clutch plate, in order to couple them together for simultaneous rotation but with the said piston having the capability of being displaced axially, the profile coupling means comprising a plurality of bosses formed in the piston, together with elongated slots formed in the clutch plate, with each of the said bosses being engaged in a corresponding one of the said slots, the transmission being further characterized in that the said clutch plate is resiliently deformable axially.

This arrangement provides a flexible clutch plate such that the piston is able to be displaced rapidly. In addition, the clutch plate, due to the slots formed in it, does not act as a solid baffle.

The invention will be better understood in the light of the description, given blow by way of example only, of a torque transmission incorporating features of the invention. The description is given with reference to the accompanying drawings.

DESCRIPTION OF PREFERRED EMBODIMENT OF THE INVENTION

Figure 1:
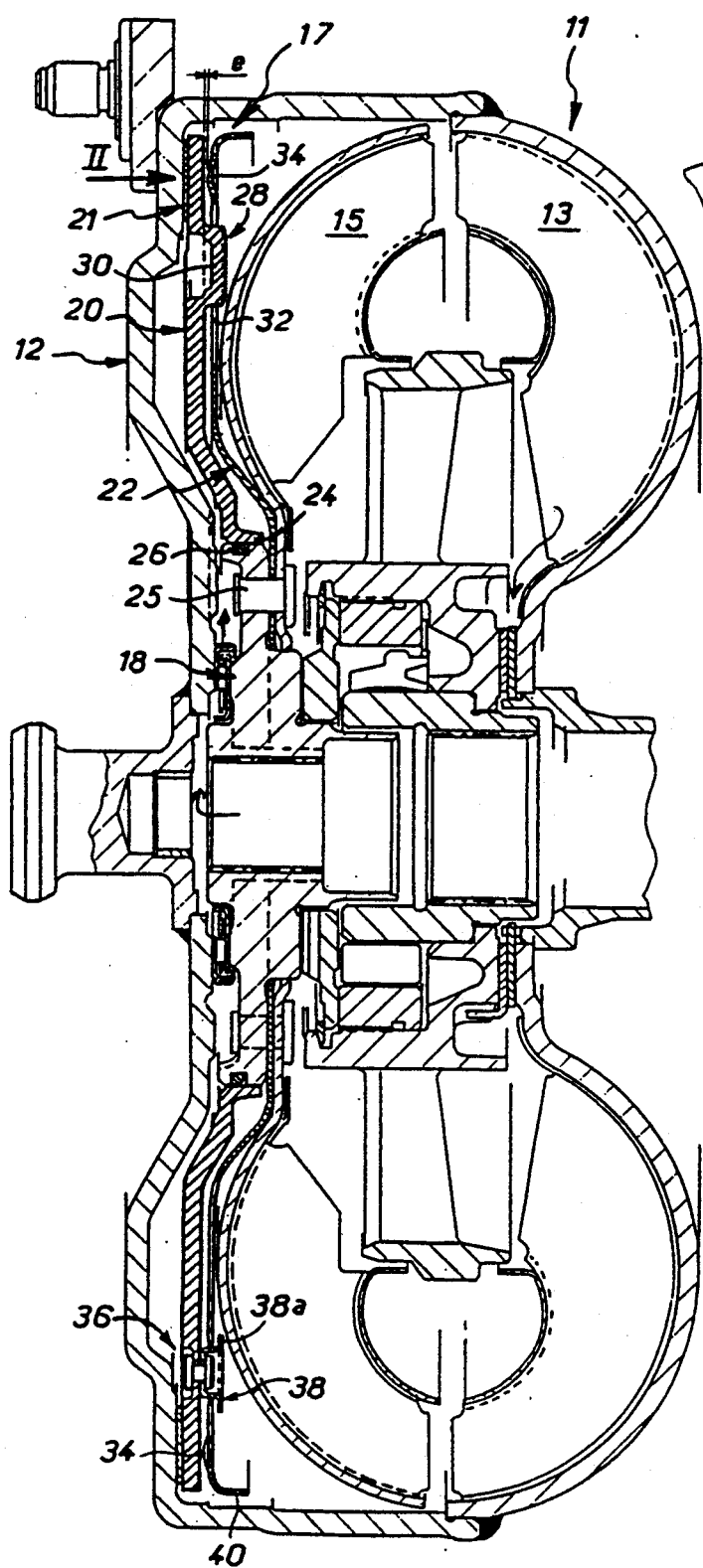
FIG. 1 is a partial view in cross section of a hydrokinetic transmission in accordance with the invention.

With reference to the drawings, a transmission 11 includes a hydraulic coupling unit. The latter essentially comprises a rotatable casing 12 which serves as an input element of the transmission. Within the casing 12, the hydraulic coupling unit comprises an impulse wheel 13, which in this example is coupled to the engine output shaft for rotation with the latter a turbine wheel 15, and a locking clutch 17. The hydraulic coupling unit itself is conventional, being for example as described in the specification of U.S. Pat. No. 4 353 444, and will not be described in detail here. It will however be noted that it essentially comprises the combination of the turbine wheel 15 coupled to a hub 18 which serves as an output element of the transmission, with the impulse wheel 13. The impulse wheel 13 is fixed directly to the internal wall of the housing 12. The hub 18 has splines for coupling it with a driven shaft, for example the input shaft of a gearbox. The clutch 17 essentially comprises a piston 20, a friction pad 21 and a clutch late 22. The clutch plate 22 is resiliently deformable, axially in this example. The hub 18 also has a flange, to which the clutch plate 22 is secured by means of rivets 25. The clutch plate lies close to the piston, as shown. The friction pad 21 is of annular shape and is situated between the piston 20 and a flat annular zone of the inner wall of the rotatable casing 12. The friction pad may be fixed either to this wall, or to the piston itself. The clutch plate 22 is a thin sheet metal pressing, and has radial openings 23 to increase its resilience. The piston 20 has the general form of a thick and rigid disc, and includes an internal cylindrical surface 24 which is slidably mounted on a corresponding cylindrical surface of the hub 18. In this example, this cylindrical hub surface is the outer periphery of the above mentioned flange of the hub: this arrangement enables the axial gulf of the assembly to be reduced. An O-ring seal 26 is mounted in an annular groove of the hub 18, and is in contact with the cylindrical sliding surface 24 of the piston.

It will be noted that the piston is able to be displaced by reversal of pressure, in a chamber which is defined between the piston 20 and the wall of the casing 12 that faces towards the piston 20. To this end, the output shaft (not shown) which is associated with the hub 18 is hollow, and during disengagement of the clutch, a pump (not shown) is operated to admit oil under pressure so that the oil penetrates into the space defined between the casing 12 and the piston 20. This causes the piston 20 to move away from the casing 12. After circulation within the hydraulic coupling unit, the oil passes through a passage formed between the hub of the reaction or turbine wheel 15 and the flange of he casing 12, to reach a return chamber. The path travelled by the oil is indicated in FIG. 1 by arrows.

During re-engagement of the clutch, the direction of the oil circulation is reversed, and the piston 20 then couples the driven shaft to the driving shaft, the turbine wheel 15 being locked upon to the driving shaft and the impulse wheel 13 being locked up to the driven shaft.

A significant feature of the invention is that profiled coupling means 28 are provided between the piston 20 and the clutch plate 22, for coupling these two members for rotation together while allowing a limited axial translational movement of the piston 20 to take place by sliding on the hub 18. The profiled coupling means 28 are spaced apart circumferentially at regular intervals, and comprise bosses 390, which are formed by embossing the piston, together with openings 32 formed in the clutch plate 22 and elongated in the radial direction to form slots. Each boss 30 engages in a corresponding one of the openings or slot 32. The width of each boss 30 is related to the width of the corresponding slot 32, in such a way as substantially to eliminate any circumstantial clearance between the piston 20 and the clutch plate 22. The bosses 30 are, in this example, arranged outside the median zone of the turbine wheel 15, in order to reduce the axial bulk of the assembly and in order to make better use of the available space. It will be appreciated that the slots 32 also assist in the flexibility of the clutch plate 22.

In addition, the clutch plate 22 is provided with abutment bosses 34, which are spaced apart at regular intervals, preferably in the vicinity of the outer periphery of the clutch plate. It will be noted that the radial positioning of the bosses 34 allows the axial stiffness of the clutch plate 22 to be adjusted. These abutment bosses are directed towards the piston 20, so as to define a predetermined clearance e between each abutment boss 34 and the adjacent portion of the piston against which it can abut. This controlled clearance e allows the piston to execute a rapid, slight movement on disengagement of the clutch. The clearance can be controlled by axial retaining means 36, which are provided between the clutch plate 22 and the piston 20. In practice, having regard to wear in the friction pad 21, the distance between the bosses 34 and the clutch plate 22 will be able to remain constant due to the retaining means 36. In the sample shown, each of the latter comprises a bell washer 38, which is flared at its free edge to define a small flange 38a. Each bell washer 38 is fixed to the piston 20 in its central position and is engaged in a corresponding hole 390 formed in the clutch plate 22. The flange 38a of each bell washer has a larger diameter than the corresponding hole 39 and thus provides an abutment which lies facing, and which cooperates with, the clutch plate. This arrangement not only controls the clearance e, but also allows the piston 20 and the clutch plate 22 to be retained in coupled relationship with each other, and this facilitates the process of assembly and reduces the length of the bosses 30. It will be noted, incidentally, that the bell washers 38 will serve to limit any wrinkling or twisting of the thin web of the clutch plate under the influence of the applied torque.

Figure 2:
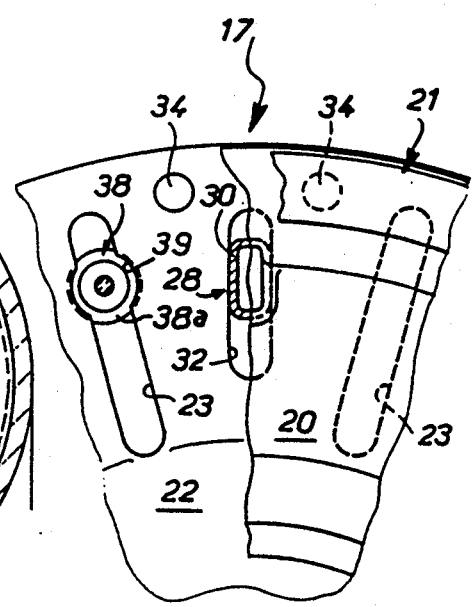
FIG. 2 partially shows the locking clutch, seen in the direction of the arrow II of FIG. 1.

As is shown in FIG. 2, the abutment bosses 34 are situated close to the profiled coupling means 28. More particularly, each profiled coupling 28, 32 between the clutch plate 22 and the piston 20 is associated with two of the abutment bosses 34, offset circumferentially on either side of the profiled coupling. In addition, the clutch plate 22 is so shaped that it has a cylindrical portion 40 at its outer periphery, which reduces buckling effects. The disposition of the various abutment bosses 34 on the clutch plate 22 ensures optimum piston displacement, with the piston 20 remaining parallel, i.e. truly radial, at all times so that it always slides easily on the hub. Moreover, the cylindrical sliding surface 24 also serves as an axial abutment surface by cooperation with the base portion o the clutch plate 22. Any deterioration of the turbine wheel 15 is thus prevented. When the piston 20 reaches the end of its axial sliding movement, the clutch plate 22 is then in a prestressed and resiliently deformed condition, which facilitates rapid engagement of the piston on the subsequent operation of the clutch, compensating for the force which is present due to the presence of the O-ring 26. The bell washers 38 are also situated in the immediate vicinity of the profiled coupling means 28, thus ensuring torque transmission between the clutch plate 22 and the piston 20; to this end, the bell washers are situated radially inwardly of the abutment bosses 34. In the example shown, there are six of the profiled coupling means 28, 32, and six bell washers 38, all spaced apart circumferentially at regular intervals.

The invention makes it possible to achieve rapid control of the sliding action of the clutch, while varying the pressure in the chambers defined on either side of the piston 20, for example with the aid of an electronic computer controlling the pump which supplies the oil.

Finally, it will be noted that the friction pad or pads 21 can be arranged to extend over the circumference of a circle having a large diameter.

What is claimed is:

1. A torque transmission comprising an input element, an output element, a hydraulic coupling unit operatively connected between said input element and said output element, and a locking clutch for releasably mechanically coupling the input element directly with the output element, the transmission further including a hub, and said locking clutch including a clutch plate, means securing the clutch plate to said hub, and a piston having a cylindrically surface mounting the piston slidably on said hub, the transmission further comprising friction pad means between one part of the transmission comprising said input or output element on the one hand, and said piston on the other, whereby the piston can engage against said transmission part through the friction pad means, the transmission further comprising purified coupling means arranged between said piston and clutch plate, for coupling said piston and clutch plate together for simultaneous rotation while permitting limited axial translation of said piston, said profiled coupling means comprising a plurality of obsess formed in said piston together with radially elongated slots formed in said clutch plate, with each boss engaging in a corresponding said slot, the clutch plate being axially resiliently deformable, and said clutch plate having a plurality of abutment bosses spaced apart at regular intervals and projecting towards said piston.

2. A torque transmission according to claim 1, further comprising means defining a predetermined clearance between each of said abutment boss and a corresponding portion of the said piston on which the abutment boss is engageable. said locking clutch including a clutch plate, means securing the clutch plate to said hub, and a piston having a cylindrical surface mounting the piston slidably on said hub, the transmission further comprising friction pad means between one part of the transmission comprising said input or output element on the one hand, and said piston on the other, whereby the piston can engage against said transmission part through the friction pad means, the transmission further comprising profiled coupling means arranged between said piston and clutch plate, for coupling said piston and clutch plate together for simultaneous rotation while permitting limited axial translation of said piston, said profiled coupling means comprising a plurality of bosses formed in said piston together with radially elongated slots formed in said clutch plate, with each boss engaging in a corresponding said slot the clutch plate being axially resiliently deformable, and said clutch plate having a plurality of abutment bosses spaced apart at regular intervals and projecting towards said piston.

3. A torque transmission according to claim 1, further comprising axial retaining means coupling said clutch plate and the said piston together, said axial retaining means comprise a plurality of bell washers each comprising a central part and having a flared edge portion, means securing each bell washer to said piston through its said central part, said clutch plate having a plurality of apertures with a said bell washer engaged in each of said apertures, the flared edge portion of each bell washer defining a flange the diameter of which is larger than that of the corresponding said aperture in the clutch plate, whereby each said flange defines an abutment surface facing toward the clutch plate.

4. A torque transmission according to claim 1, wherein the abutment bosses formed in the clutch plate are situated in the vicinity of said profiled coupling means.

5. A torque transmission according to claim 4, wherein each said profiled coupling means between said clutch plate and piston is associated with two said abutment bosses offset circumferentially on either side of the respective said profiled coupling means.

6. A torque transmission according to claim 1, wherein the said clutch plate is formed with a cylindrical portion at its outer periphery.

* * * * *